United States Patent
McIntyre, I et al.

(10) Patent No.: US 8,893,354 B2
(45) Date of Patent: Nov. 25, 2014

(54) ACTIVE HINGE WITH RESET MECHANISM

(71) Applicant: M&C Corporation, Sterling Heights, MI (US)

(72) Inventors: Andrew McIntyre, I, Midland (CA); Michael Duffy, Midland (CA)

(73) Assignee: M&C Corporation, Sterling Heights, MI (US)

( * ) Notice: Subject to any disclaimer, the term of this patent is extended or adjusted under 35 U.S.C. 154(b) by 0 days.

(21) Appl. No.: 14/039,605

(22) Filed: Sep. 27, 2013

(65) Prior Publication Data

US 2014/0182962 A1 Jul. 3, 2014

Related U.S. Application Data

(63) Continuation-in-part of application No. 13/559,856, filed on Jul. 27, 2012, now Pat. No. 8,544,590.

(60) Provisional application No. 61/513,114, filed on Jul. 29, 2011.

(51) Int. Cl.
*E05D 11/10* (2006.01)
*B60R 21/38* (2011.01)

(52) U.S. Cl.
CPC ..................................... *B60R 21/38* (2013.01)
USPC ................. 16/343; 16/288; 16/370; 180/274; 296/187.04

(58) Field of Classification Search
USPC ........... 16/357, 360, 361, 366, 368–370, 343, 16/348, 287, 288, 302; 403/116; 180/69.2, 180/69.21, 274; 296/187.04, 193.11
See application file for complete search history.

(56) References Cited

U.S. PATENT DOCUMENTS

| | | | |
|---|---|---|---|
| 2,817,870 A | 12/1957 | Howell | |
| 3,813,323 A | 5/1974 | Ogawa | |
| 4,727,621 A | 3/1988 | Emery et al. | |
| 7,506,716 B1 | 3/2009 | Salmon et al. | |
| 7,596,833 B2 | 10/2009 | Erwin | |
| 7,802,345 B2 | 9/2010 | Mathew et al. | |
| 7,845,053 B2 | 12/2010 | Marsh et al. | |
| 7,854,289 B2 | 12/2010 | Gust | |
| 7,987,939 B2 | 8/2011 | Kisiler et al. | |
| 2009/0288271 A1 | 11/2009 | Kmieciak et al. | |
| 2009/0289473 A1 | 11/2009 | Kmieciak | |
| 2013/0025958 A1 | 1/2013 | McIntyre | |
| 2013/0074284 A1* | 3/2013 | Kuhr et al. | ...................... 16/222 |

OTHER PUBLICATIONS

International Search Report PCT/US13/063634, mailed Mar. 10, 2014.

* cited by examiner

*Primary Examiner* — William Miller
(74) *Attorney, Agent, or Firm* — Nixon & Vanderhye P.C.

(57) ABSTRACT

An active hinge with a reset mechanism that disables an additional degree of freedom in the hinge's movement to permit the trailing edge of a vehicle hood to lift is disclosed. The active hinge includes a deployment bracket on which a reset clip is mounted, a hood bracket for attachment to the vehicle's hood, and a body bracket for attachment to the vehicle's body. To re-lock movement between the deployment bracket and the hood bracket, an engagement tab on the reset clip enters a notch in the hood bracket whereby the reset clip rotates until a locking tab on the clip engages a hole in the deployment bracket. Curved surfaces mounted on the engagement and locking tabs provide surface-to-surface contact between the reset clip and the deployment bracket, whereby the deployment bracket is not scratched when the reset clip is rotated, thereby precluding rust from developing on the deployment bracket.

22 Claims, 16 Drawing Sheets

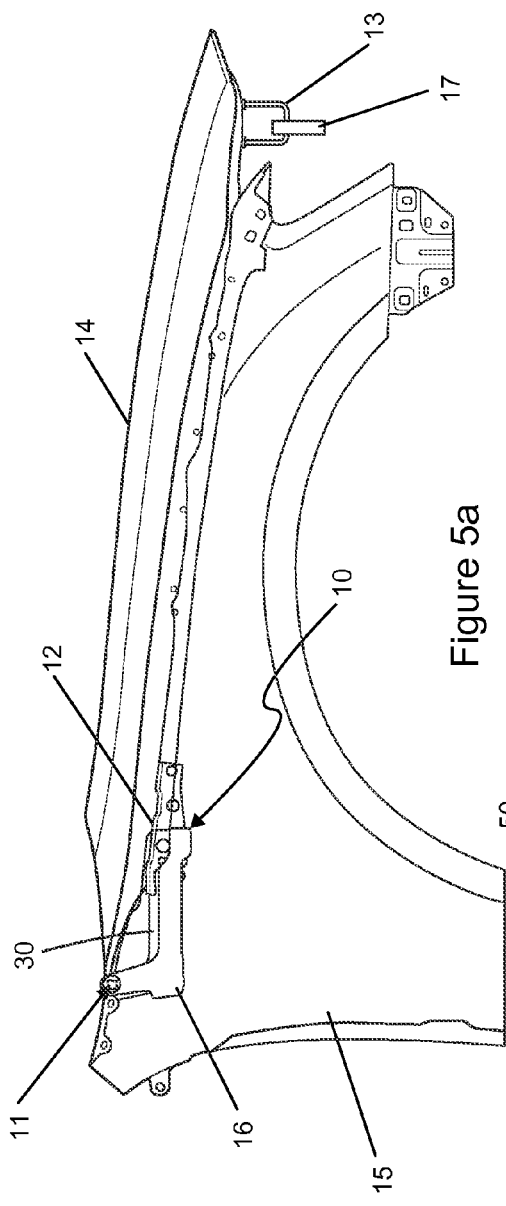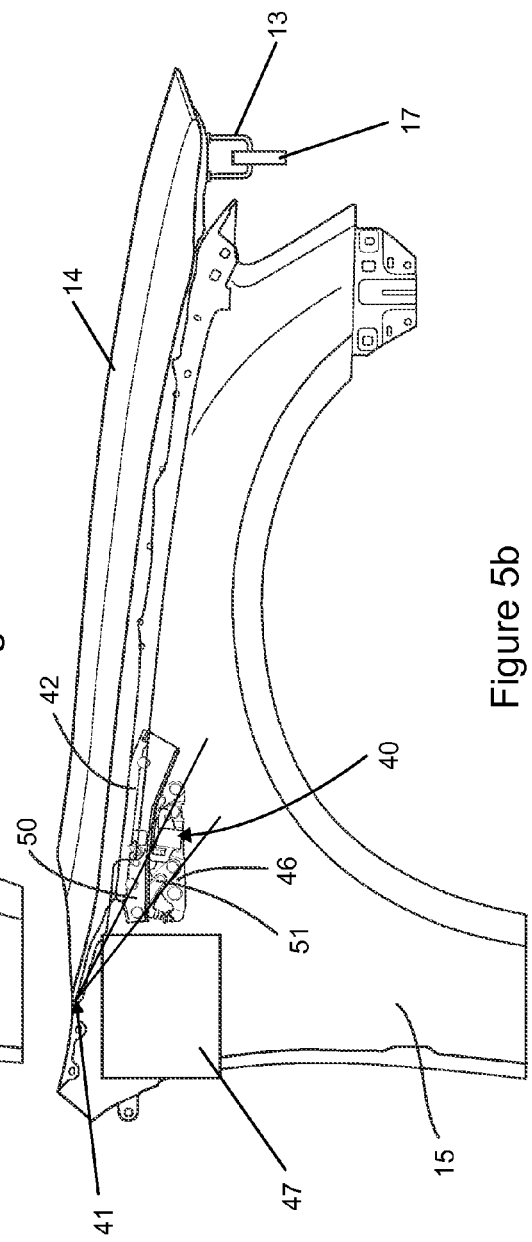
Figure 5a
Figure 5b

ACTIVE HINGE WITH RESET MECHANISM

CROSS-REFERENCES TO RELATED APPLICATIONS

This application is a continuation-in-part of U.S. application Ser. No. 13/559,856, filed Jul. 27, 2012, now U.S. Pat. No. 8,544,590, which claims the benefit of U.S. Provisional Application No. 61/513,114, filed Jul. 29, 2011, the entire contents of each of which are hereby incorporated by reference in this application.

FIELD OF INVENTION

The present invention relates to vehicle hood assemblies, and more particularly to a rest mechanism for a vehicle hood active hinge.

BACKGROUND OF THE INVENTION

Active hinges are used as part of a pedestrian protection system on vehicles. Active hinges are used to provide vehicle hoods with an additional degree of freedom in the hood's movement when a pedestrian is struck by a vehicle, to thereby reduce the injuries to the pedestrian when contacting the vehicle's hood as the pedestrian collides with the vehicle. After deployment, the active hinge's additional degree of freedom prevents the hood hinge from functioning normally.

BRIEF DESCRIPTION OF THE INVENTION

The present invention provides a manual reset feature for active hinges. The reset feature is used to lock the additional degree of freedom and permit the hinge to function. Thus, the present invention is directed to an active hinge with a reset mechanism that disables the additional degree of freedom in the hinge's movement to permit the trailing edge of the vehicle hood to lift when colliding with a pedestrian.

The active hinge includes a deployment bracket on which a reset clip is rotatably mounted, a hood bracket attached to the vehicle's hood, and a body bracket attached to the vehicle's body. The reset clip is comprised of an engagement tab and a locking tab located a predetermined angular distance away from the engagement tab around the circumference of the reset clip. To re-lock the movement between the deployment bracket and the hood bracket resulting from the hood bracket rotating around a degree of freedom pivot on the deployment bracket when a pedestrian collides with the vehicle, an engagement tab on the reset clip enters a notch in the hood bracket so that the reset clip rotates until a locking tab on the clip engages a hole in the deployment bracket. The locking tab engaging the hole prevents further rotation of the hood bracket in either direction, to thereby maintain the active hinge in a reset position.

BRIEF DESCRIPTION OF THE DRAWINGS

FIG. 5a is a side elevational view of the single pivot active hinge and reset clip of FIG. 1 mounted in a vehicle prior to a collision with a pedestrian.

FIG. 5b is a side elevational view of the multi-bar active hinge and reset clip of FIG. 4 mounted in a vehicle prior to the vehicle colliding with a pedestrian.

DETAILED DESCRIPTION OF THE INVENTION

As discussed above, active hinges are used as part of pedestrian protection systems on vehicles. Active hinges are used for the mounting of vehicle hoods on vehicle bodies in an effort to introduce an additional degree of freedom in the movement of a vehicle's hood when a pedestrian is struck by a vehicle to thereby reduce the injuries to pedestrians contacting the vehicle's hood when colliding with the vehicle.

Figure 1:
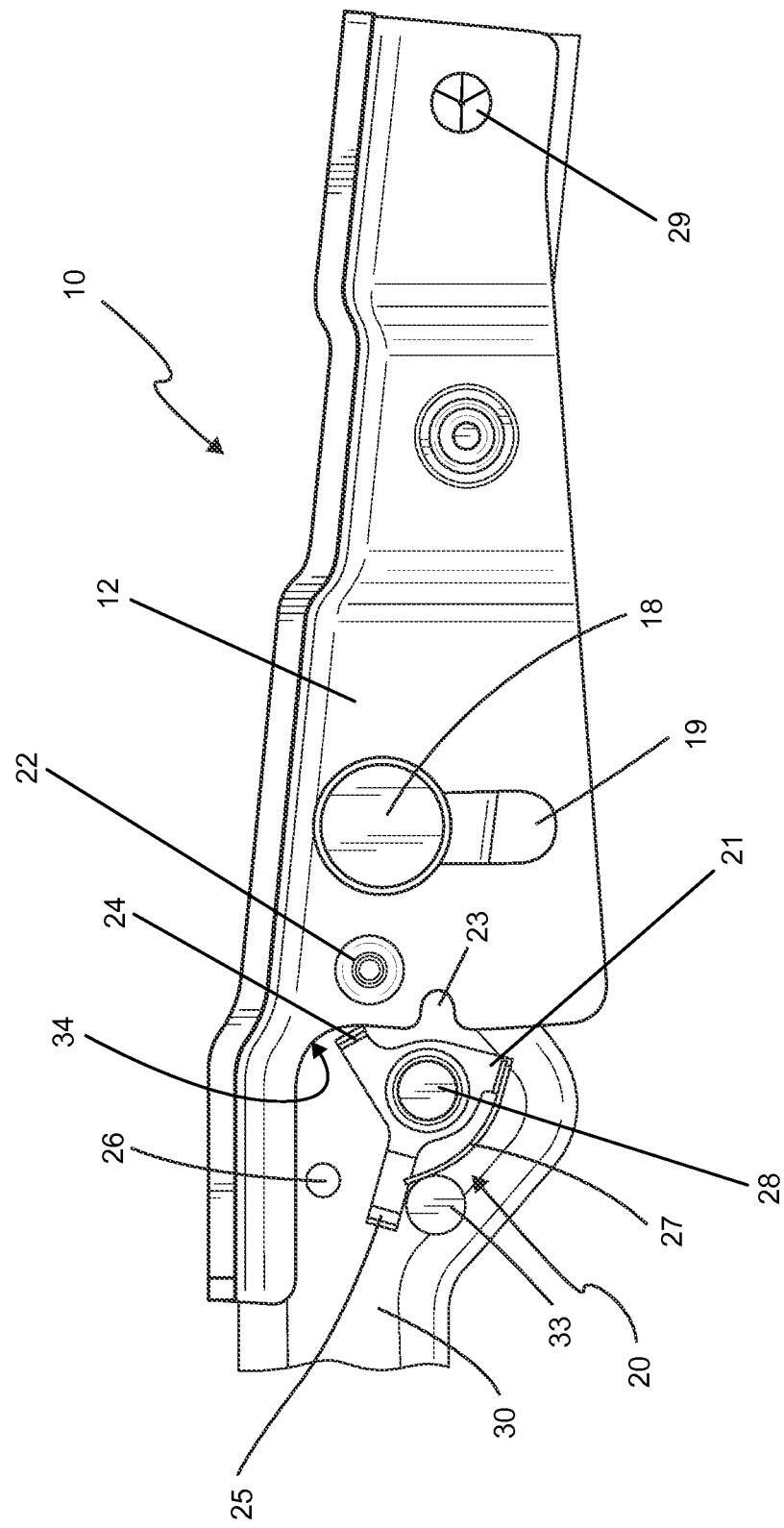
FIG. 1 is a side elevational view of a single pivot active hinge including a reset clip with the hinge being in a pre-deployed position.

FIG. 1 is a side elevational view of one embodiment of a single pivot active hinge 10 including a reset clip 21, with the hinge 10 being in a pre-deployed position. FIG. 5a shows the single pivot active hinge 10 mounted in a vehicle prior to the vehicle colliding with a pedestrian. As can be seen in FIG. 1, the active hinge 10 includes a hood bracket 12, a body bracket 16 and a deployment bracket 30 on which is mounted the reset clip 21 according the present invention. As can be seen in FIG. 5a, the active hinge hood bracket 12 is attached to the vehicle's hood 14, and the body bracket 16 is attached to the vehicle's body 15.

Figure 7:
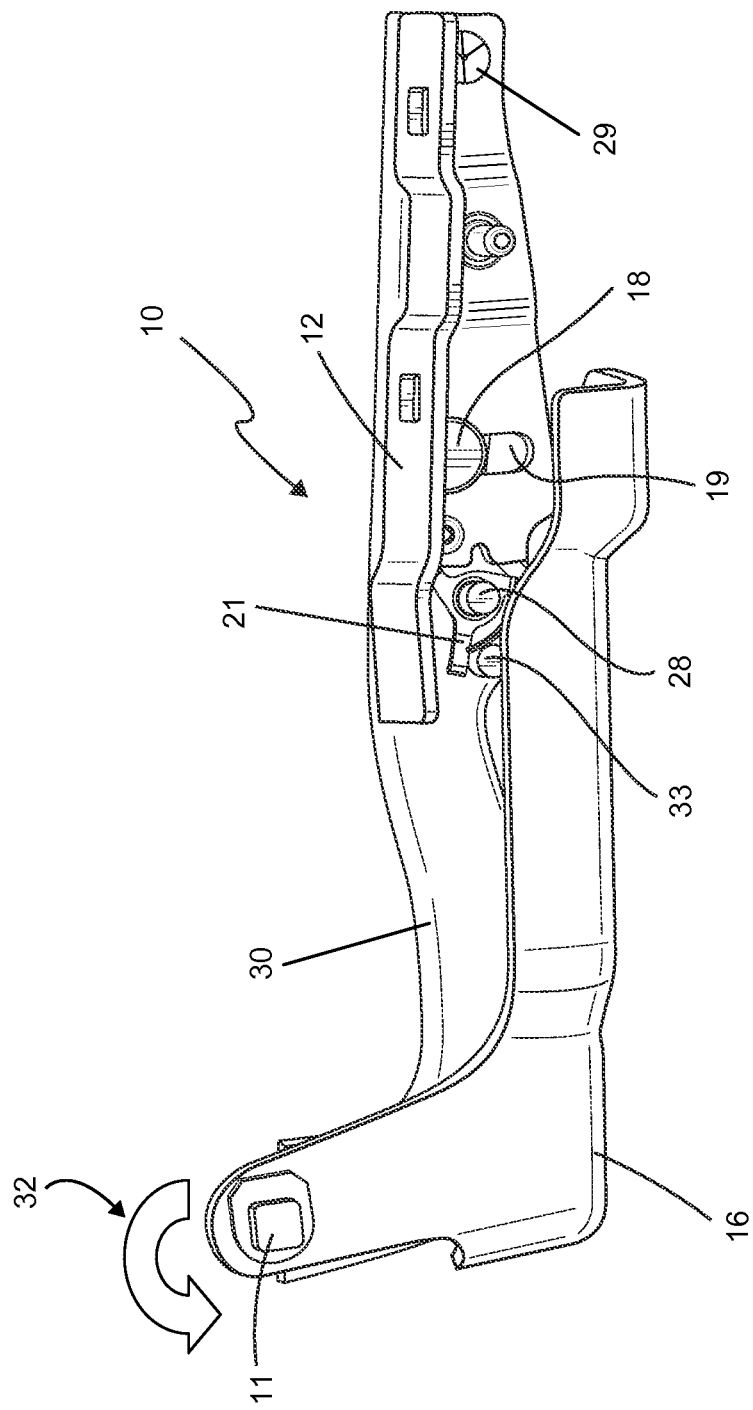
FIG. 7 is a side perspective view of the single pivot active hinge in its normal single degree of freedom configuration.

The body bracket 16 includes a pivot 11 about which the deployment bracket 30, and thus the hood 14, which is attached to the deployment bracket 30 through the hood bracket 12, can rotate from a closed position to an open position. The rotational motion 32 of hinge 10 about pivot 11 is depicted in FIG. 7. The vehicle hood 14 is also provided, at its forward end, with a locking arrangement, which includes a latch 17 and a striker 13. When the striker 13 is released from the latch 17, the hood 14 can be opened by rotating it about pivot 11.

Figure 6:
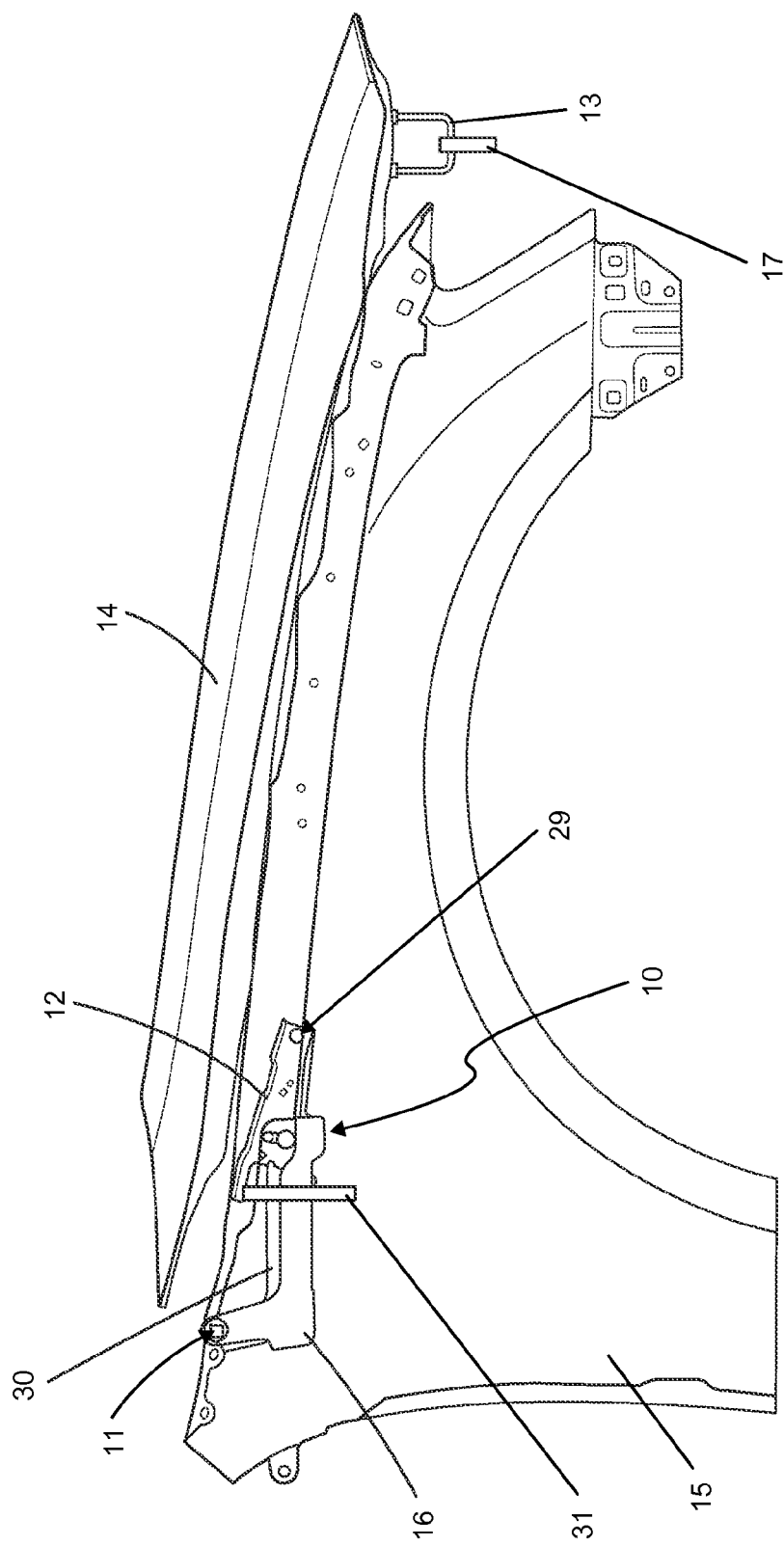
FIG. 6 is a side elevational view of the single pivot active hinge and reset clip of FIG. 1 mounted in a vehicle after the vehicle colliding with a pedestrian.

Active hinge 10 includes an additional degree of freedom in its movement to permit the trailing edge of vehicle hood 14 to lift, as shown in FIG. 6, when the vehicle collides with a pedestrian and while the striker 13 is still engaged with the latch 17. In normal (or pre-collision) situations, this additional degree of freedom is disabled by a shear pin 22, shown in FIG. 1, which permits normal usage of the hood 14.

Figure 2:
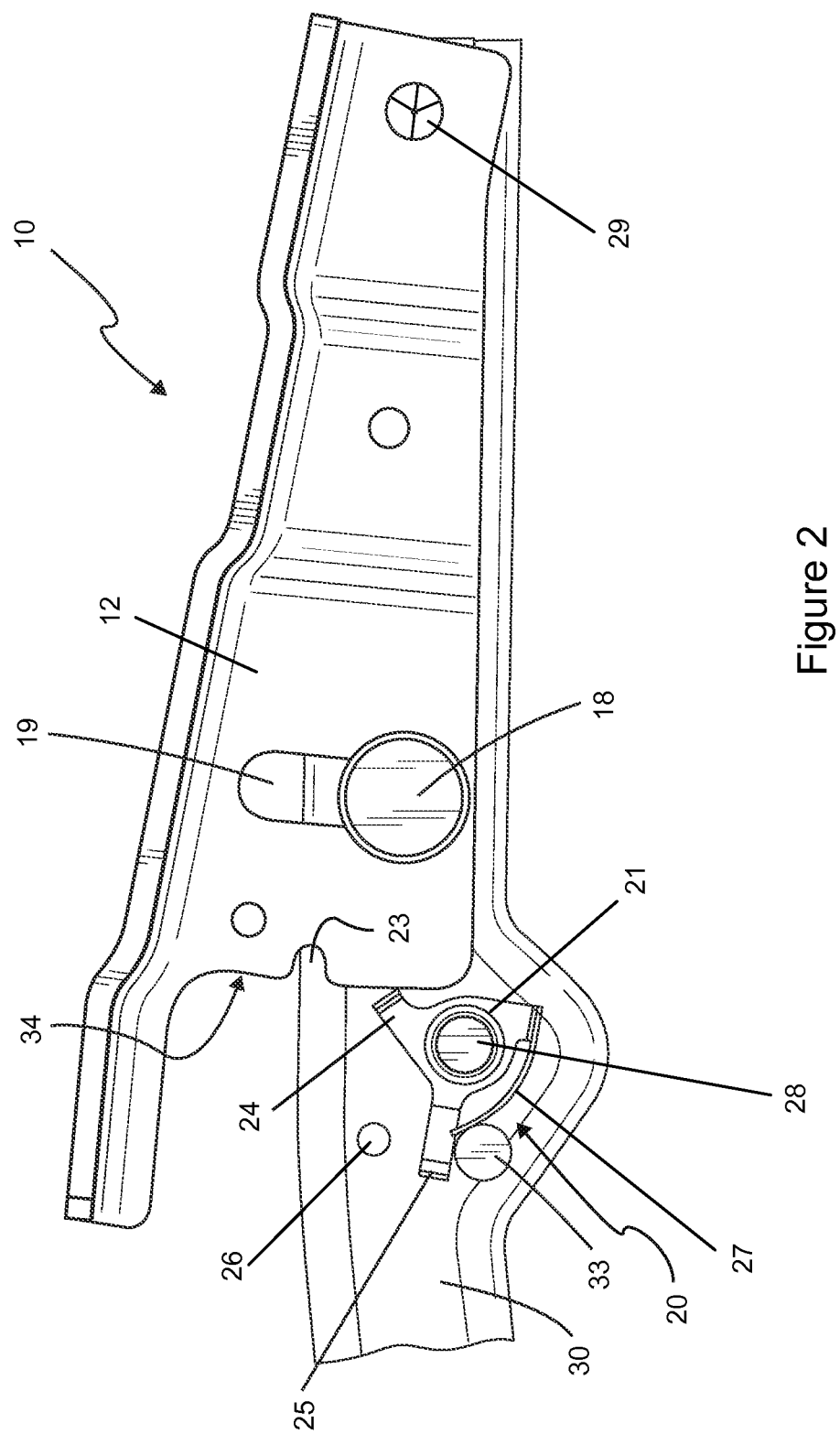
FIG. 2 is a side elevational view of the single pivot active hinge and reset clip of FIG. 1 with the hinge being in a deployed position.
Figure 3A:
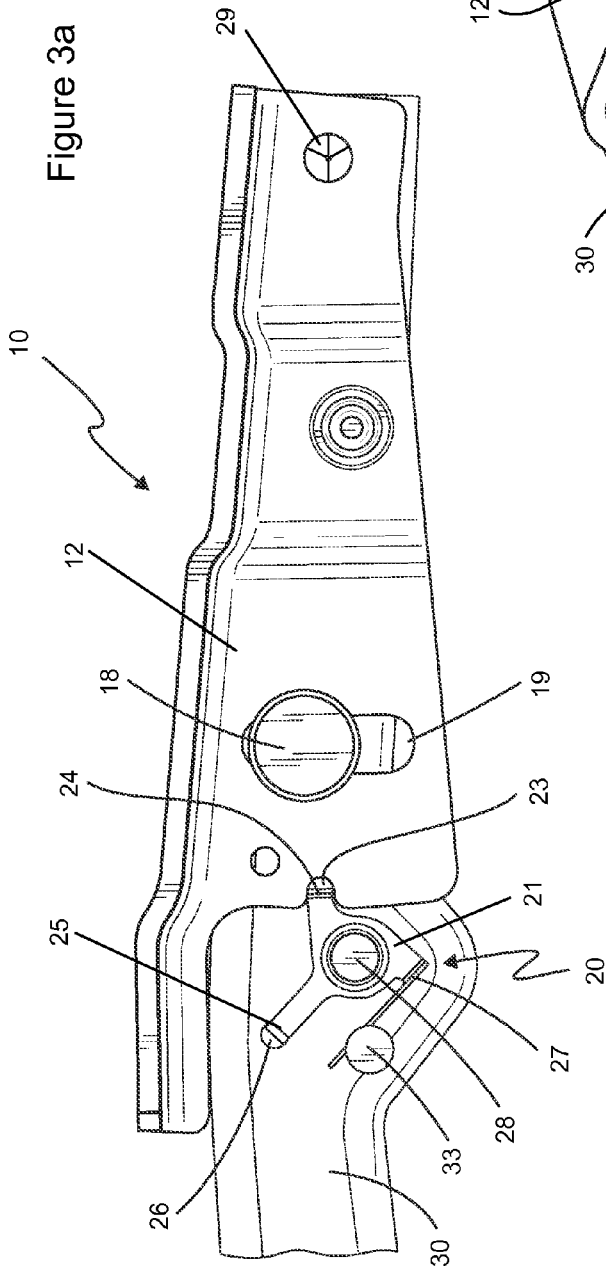
FIG. 3a is a side elevational view of the single pivot active hinge and reset clip of FIG. 1 with the hinge being in a reset position.
Figure 3B:
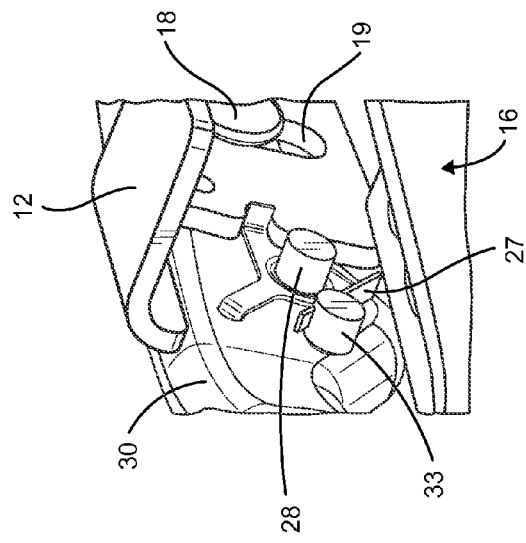
FIG. 3b is a partial side perspective view of the single pivot active hinge and reset clip of FIG. 1 with the hinge being in a reset position.

When a collision with a pedestrian is detected, an actuator 31, as shown in FIG. 6, applies an upward force on the hood bracket 12, which is sufficient to fracture the shear pin 22. The fracturing of shear pin 22 allows the hood bracket 12, and thus hood 14 which is attached to bracket 12, to pivot about an additional degree of freedom pivot 29 and reach a deployed position, as shown in FIGS. 2, 6 and/or 8. The movement of hood bracket 12, and thus hood 14, to the deployed position is limited by the movement of a pin 18 positioned within a guide slot 19 in hood bracket 12, as can be seen in FIGS. 1 and 2. In the deployed position, the hood 14 has sufficient clearance to allow unrestricted deformation of the hood 14 to "cushion" a pedestrian impact.

Figure 8:
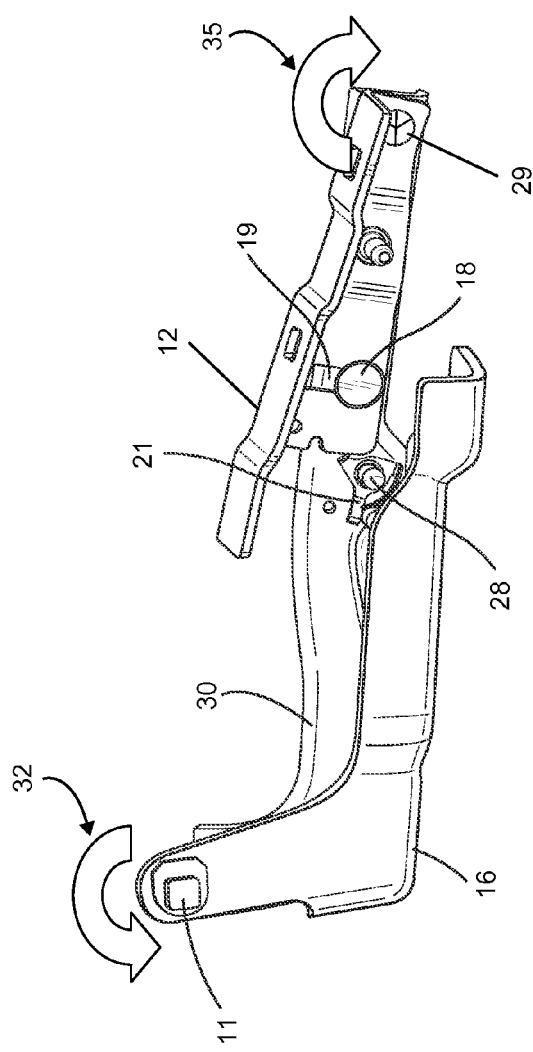
FIG. 8 is a side perspective view of the single pivot active hinge in its additional degree of freedom configuration.

Active hinge 10 allows an additional degree of freedom in the movement of vehicle hood 14 in response to the vehicle colliding with a pedestrian, but without the active hinge 10 deforming or absorbing energy during the vehicle hood impacting with the pedestrian. Thus, when the additional movement of vehicle hood 14 is required, the shear pin 22 of active hinge 10 is fractured by means of actuator 31 or some other device applying an upward force on the hood bracket 12, as explained above. When shear pin 22 is fractured, hood bracket 12 is then able to pivot about the additional degree of freedom pivot 29 as the hinge 10 pivots about pivot 11. The rotation of hinge 10 about pivot 11 and the simultaneous rotation of hood bracket 12 about pivot 29 allow the vehicle hood 14 attached to hood bracket 12 to lift, as shown in FIG. 6, without permanently deforming the hinge 10, as shown in FIG. 2. The rotational motion 32 of hinge 10 about pivot 11 and the rotational motion 35 of hood bracket 12 about pivot 29 are depicted in FIG. 8.

When the additional degree of freedom in the movement of vehicle hood 14 is not required, the movement between deployment bracket 30 and hood bracket 12 caused by hood bracket 12 rotating about pivot 29 is disabled and locked by having reset clip 21 engage hood bracket 12. This restores active hinge 10 to a single degree of freedom operation, that is, the rotation of hinge 10 about pivot 11.

A hinge 10 reset mechanism 20 is shown is several operational positions in FIGS. 1-3b. The reset mechanism 20 includes a reset clip 21, a notch 23 in an edge 34 of hood bracket 12 and a hole in the deployment bracket 30 that are engaged by reset clip 21 and a spring arm 27 that also engages reset clip 21 and another pin 33. Reset clip 21 is shown in FIGS. 1-3b in several rotational positions that correspond to the several operational positions of reset mechanism 20 depicted in these figures. These rotational positions vary according to the position of hood bracket 12. Reset clip 21 includes an engagement tab 24, which, when active hinge 10 is in its pre-deployed position, is held against hood bracket 12 by means of a spring arm 27 that engages another pin 33 also mounted on deployment bracket 30.

During deployment of the active hinge 10, so as to allow vehicle hood 14 to lift as shown in FIG. 6, hood bracket 12 rotates about pivot 29. As hood bracket 12 rotates about pivot 29, engagement tab 24 slides along an edge 34 of hood bracket 12 and past a notch 23 in edge 34 until the deployed position shown in FIGS. 2, 6 and 8 reached by bracket 12. Engagement tab 24 slides past a notch 23 in edge 34 because the spring arm 27 and the pin 33 engaged by spring arm 27 prevent the reset clip 21, and thereby engagement tab 24 from rotating, so as to prevent tab 24 from entering notch 23.

Figure 9:
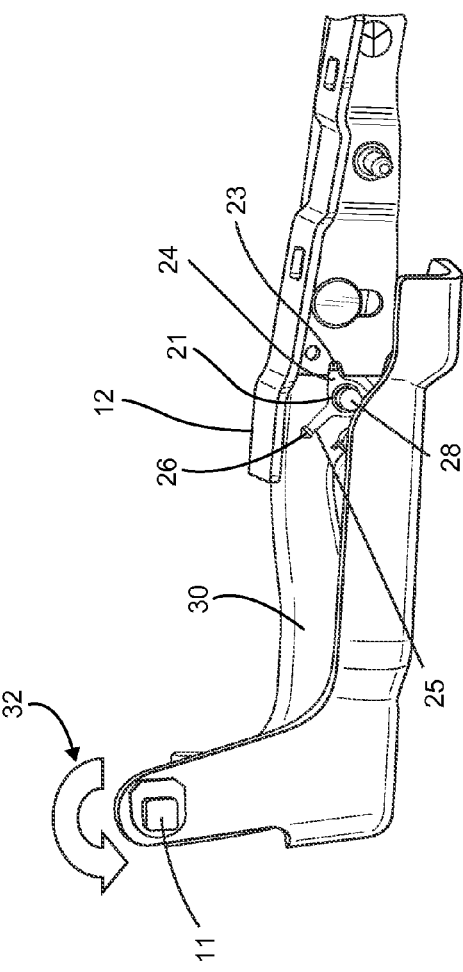
FIG. 9 is a side perspective view of the single pivot active hinge in its reset configuration with the reset clip engaged.

After deployment of active hinge 10, to re-lock the movement between the deployment bracket 30 and the hood bracket 12 that results from bracket 12 rotating around pivot 29, a downward force is applied to the vehicle hood 14, and thus hood bracket 12. Application of the downward force causes engagement tab 24 to again slide along edge 34 of hood bracket 12 in the opposite direction, which allows engagement tab 24 to enter notch 23 in hood bracket 12. As engagement tab 24 enters notch 23 in hood bracket 12 and bracket 12 continues to move downward in response to the downward force, reset clip 21 is caused to rotate about pivot pin 28 until a locking tab 25 on reset clip 21 engages a hole 26 in the deployment bracket 30. Locking tab 25 engaging hole 26 prevents further rotation of hood bracket 12 in either direction, to thereby maintain active hinge 10 in a reset position shown in FIGS. 3 and 9.

Figure 4:
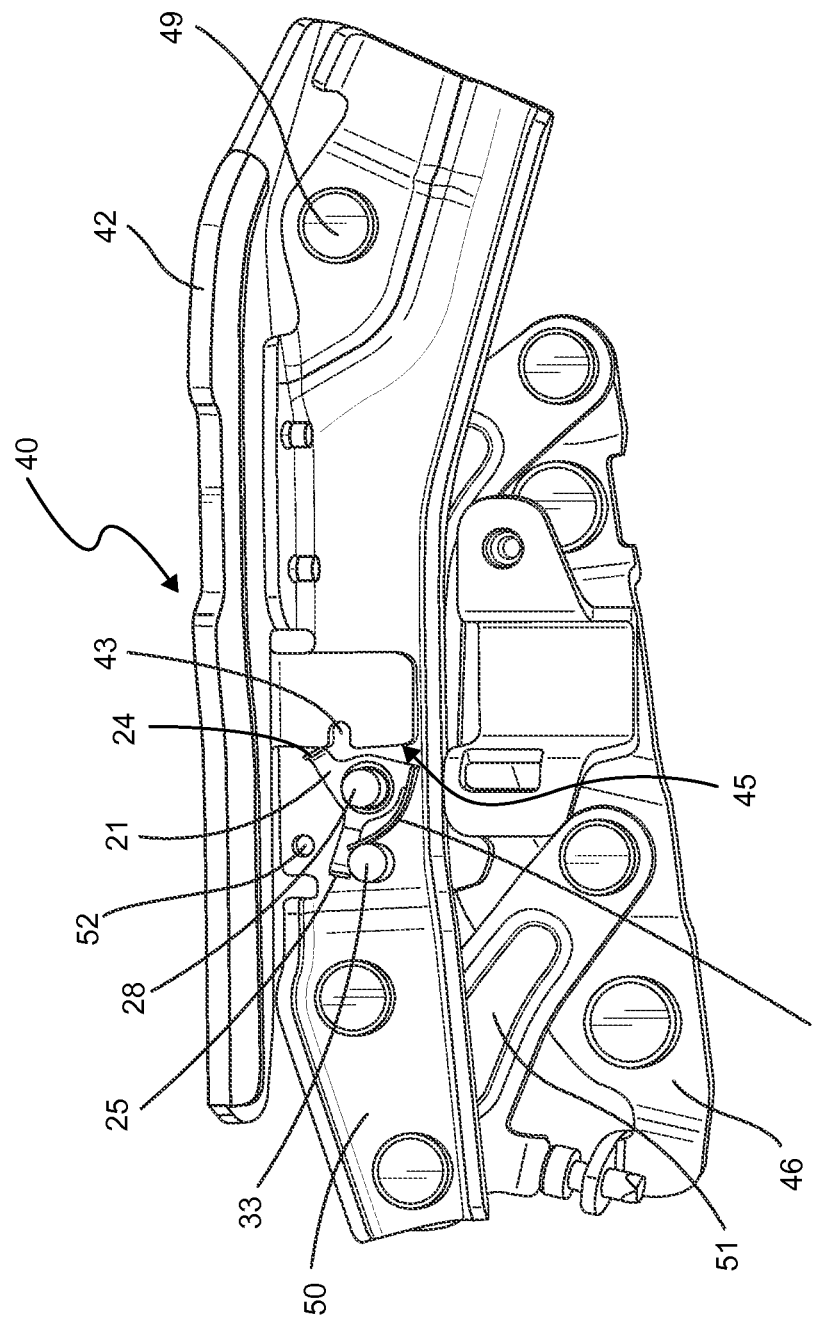
FIG. 4 is a side elevational view of a multi-bar active hinge including a reset clip with the hinge being in a pre-deployed position.

The reset mechanism 20 and reset clip 21 and their operation shown in FIGS. 1-3 and 5a-9 can also be used in multi-bar active hinges, like the multi-bar active hinge 40 shown in FIG. 4. The embodiment of a multi-bar active hinge 40 shown in FIG. 4A is a four bar active hinge. A multi-bar active hinge, like hinge 40, is used where there is some physical barrier 47 preventing the proper placement of a hood pivot, like pivot 11, as shown in FIG. 5b. A multi-bar hinge 40 permits a "virtual" pivot 41 to be located where a physical pivot 11 cannot be located.

Multi-bar hinge 40 shown in FIG. 4 includes a hood bracket 42, which is engaged by reset pin 21 in a manner very similar to how rest pin 21 engages hood bracket 12 in the single pivot active hinge 10. Like edge 34 on hood bracket 12, which engagement tab 24 slides along, and notch 23 in edge 34 of hood bracket 12, which engagement tab 24 enters as hinge 10 is reset, hood bracket 42 of hinge 40 also includes a tab 48 with an edge 45, which engagement tab 24 slides along, and a notch 43 in edge 45, which engagement tab 24 of reset pin enters as hinge 40 is reset after deployment in response to a vehicle collision with a pedestrian. And, like reset clip 21 is caused to rotate about pivot pin 28 until a locking tab 25 on reset clip 21 engages a hole 26 in deployment bracket 30 of hinge 10, for hinge 40, locking tab 25 on reset clip 21 engages a hole 52 in deployment bracket 50 of hinge 40 as hood bracket 42 moves downward to a reset position in response to a downward force being applied to hood 14.

As can be seen in FIG. 4, the multi-bar hinge 40 also includes, in addition to the hood bracket 42, a body bracket 46 and a deployment bracket 50 on which is mounted the reset clip 21 according the present invention. As can be seen in FIG. 5b, the multi-bar hinge hood bracket 42 is attached to the vehicle's hood 14, and the body bracket 46 is attached to the vehicle's body 15. Pivotally mounted between deployment bracket 50 and body bracket 46 is a pivot bracket 51, which effects the rotation of the deployment bracket 50, the hood bracket 42 attached to the deployment bracket 50, and the hood 14 attached to the hood bracket 42. The rotational motion of deployment bracket 50 and hood bracket 42 that is effected using pivot bracket 51 results in vehicle hood 14 rotating from a closed position to an open position "around" virtual pivot point 41. But, here again, when a collision with a pedestrian is detected, an actuator, like the actuator 31 shown in FIG. 6, applies an upward force on the hood bracket 42, which is sufficient to fracture a shear pin, like the shear pin 22 shown in FIG. 1. The fracturing of shear pin allows the hood bracket 42, and thus hood 14 which is attached to bracket 42, to pivot about an additional degree of freedom pivot 49 and reach a deployed position.

Because no permanent deformation of the reset clip 21 occurs during the deployment and resetting of the hinges 10 or 40, such hinges can be reused multiple times. Resetting a hinge, such as hinge 10 by way of example, to its original position can be achieved by: lifting locking tab 25, applying an upward force on hood bracket 12 to disengage engagement tab 24 from notch 23, and rotating the reset clip 21 to its pre-deployed position shown in FIG. 1. This allows hood bracket 12 to be set in its pre-deployed position, also shown in FIG. 1, and shear pin 22 to be replaced, thereby restoring the hinge 10 to its original working condition, as shown in FIG. 1. A similar action can be taken to reset hinge 40 after deployment so that hood bracket 42 to be set in its pre-deployed position, which is shown in FIG. 4, and a shear pin, like pin 22, to be replaced, thereby restoring the hinge 40 to its original working condition, as shown in FIG. 4.

As explained above with respect to FIG. 6, when a collision with a pedestrian is detected, the actuator 31, which can be a pyrotechnic-type actuator, applies an upward force on the hood bracket 12, which is sufficient to fracture the pop-rivet or shear pin 22. The movement of hood bracket 12, and thus hood 14, cause the pin or guide post 18 to move within the guide or limiting slot 19, which stops the rotation of bracket 12 at the required position, as shown in FIG. 2. The reset or spring clip 21 is loaded against the trim edge 34 of the hood bracket 12 and bypasses the notch or detent 23 at actuation, but will snap into the detent 23 to reset the hinge 10 after deployment.

Figure 10:
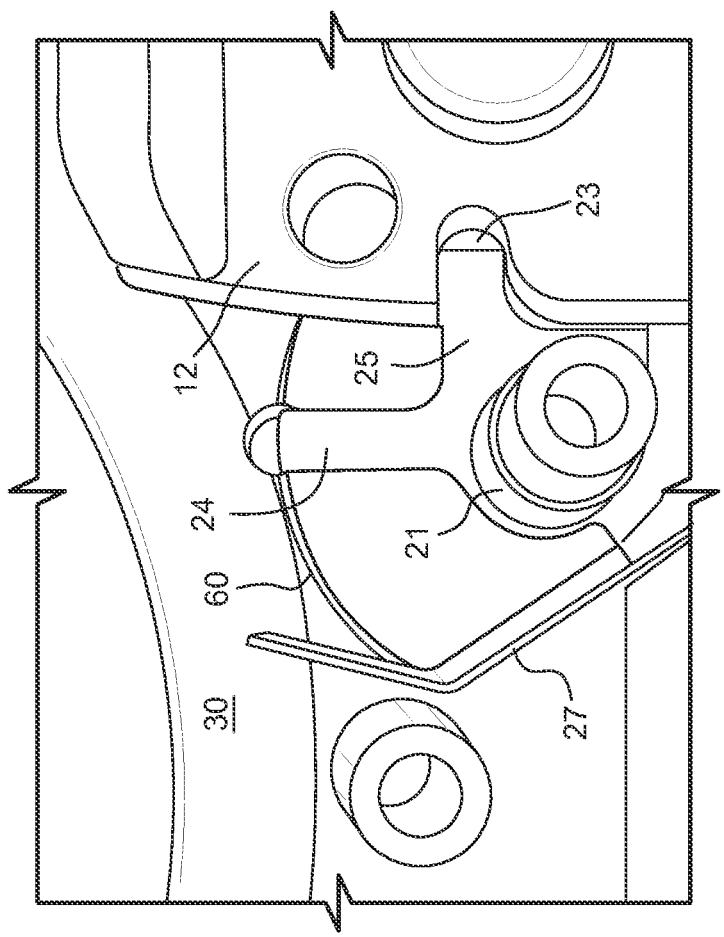
FIG. 10 is a side elevational view showing deployment of the spring clip etching an arched scratch in the deployment bracket, thereby allowing a rust area in the bracket to develop.
Figure 11:
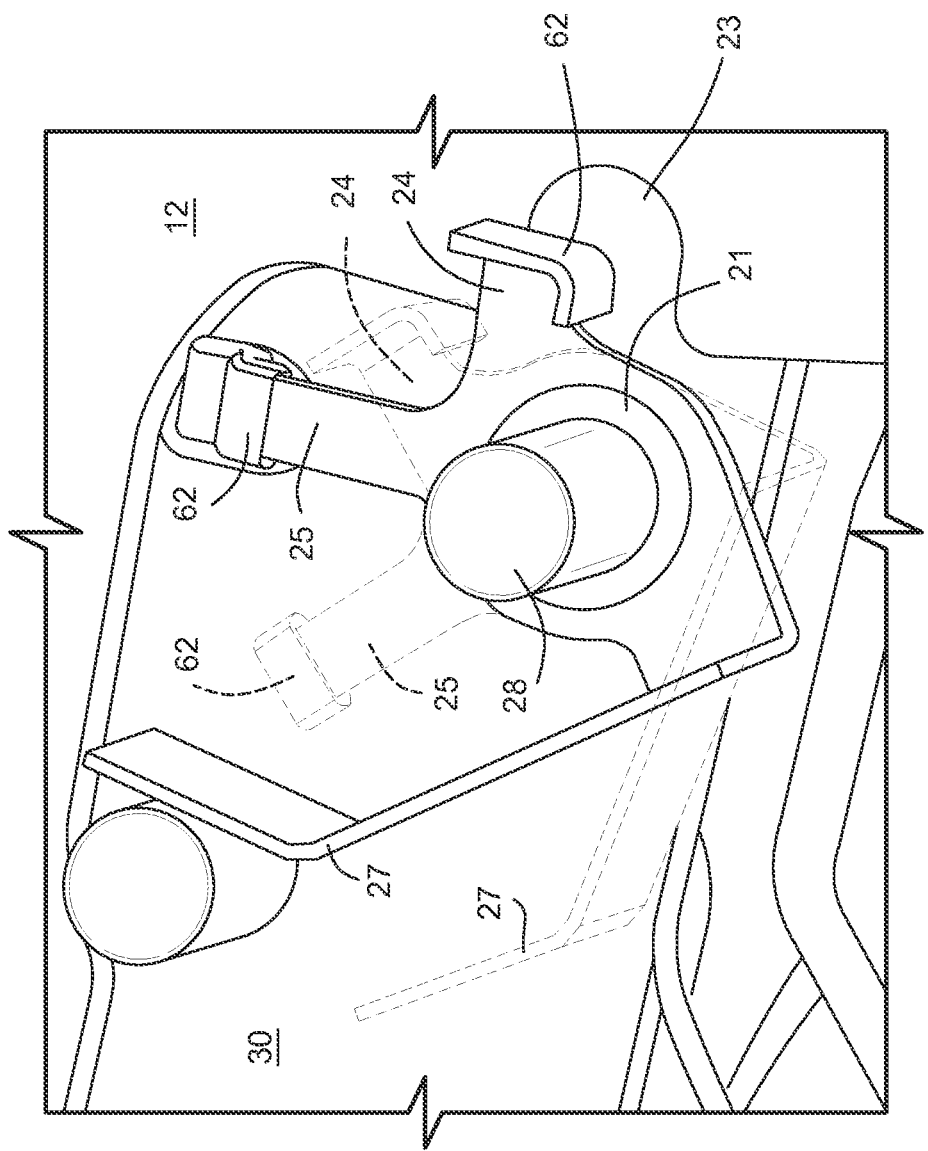
FIG. 11 is a side perspective view showing one or more curved surfaces on the spring clip to provide surface-to-surface contact between the curved surface(s) of the clip and the deployment bracket, rather than edge-to-surface contact between the clip and the bracket.

As shown in FIG. 10, deployment of the spring clip 21 etches an arched scratch 60 in the deployment bracket 30, thereby allowing a rust area in the bracket 30 to develop. One solution for this problem is to provide one or more curved surfaces 62 on the spring clip 21, as shown in FIG. 11, to provide surface-to-surface contact between the curved surface(s) 62 of the clip 21 and the deployment bracket 30, rather than edge-to-surface contact between the clip 21 and the bracket 30. A curved surface 62 can be formed on the engagement tab 24 and/or the locking tab 25 of the clip 21 using a plastic nylon powder coating that is applied to tab 24 and/or tab 25 using a dip of the tabs' edges into the powder coating, after which the coating is baked on the clip tab. The curved surfaces 62 mounted on the engagement tab 24 and the locking tab 25 provide surface-to-surface contact between the reset clip 21 and the deployment bracket 30, whereby the deployment bracket 30 is not scratched when the reset clip 21 is rotated, thereby precluding rust from developing on the deployment bracket 30.

Figure 12B:
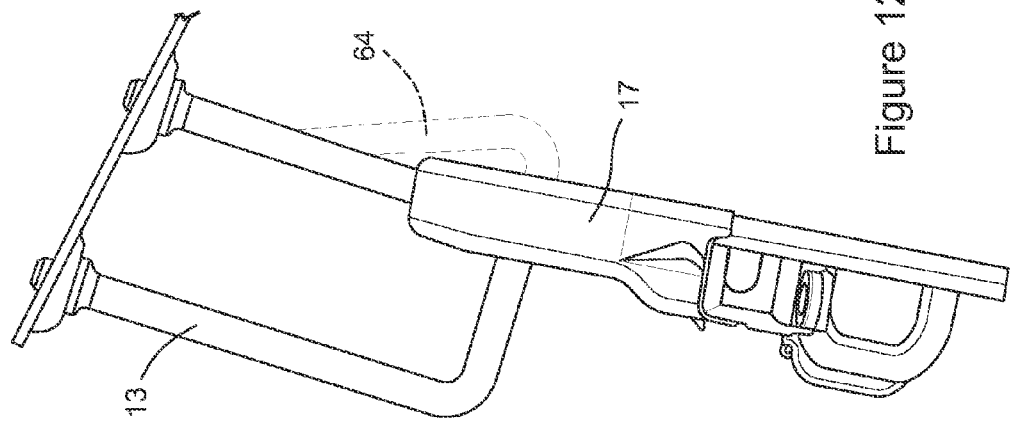
FIGS. 12a and 12b are side elevational views showing a slider joint used at the connection between the striker and the latch of some vehicles.
Figure 12A:
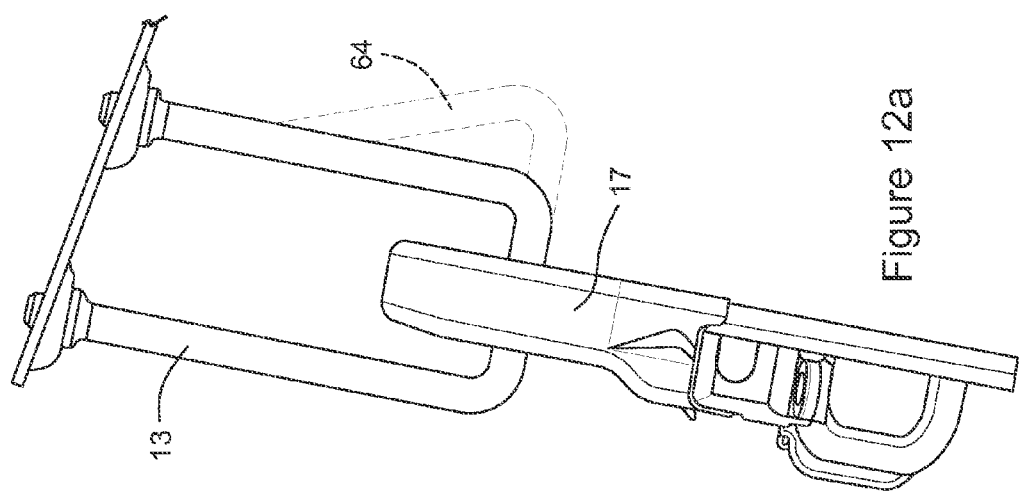

As shown in FIGS. 12a and 12b, for some vehicles, the hinge linkage geometry requires a slider joint at the connection between the striker 13 and the latch 17 of the vehicle, such that the latch 17 moves along the striker 13 as the active hinge 10 is deployed as the hood 14 and hinge 10 pivot about an additional degree of freedom pivot and reach a deployed position. This arrangement may require a modification 64 of the striker 13 to allow the latch 17 to slide. This arrangement is not acceptable on some vehicles due to seal/bumper seating requirements. One solution for this problem is to provide a slider joint arrangement between the hood bracket 42A and the deployment bracket 50A, as shown in FIGS. 13a and 13b, which allows pure rotation of the entire hood 14 about the latch point.

Figure 13A:
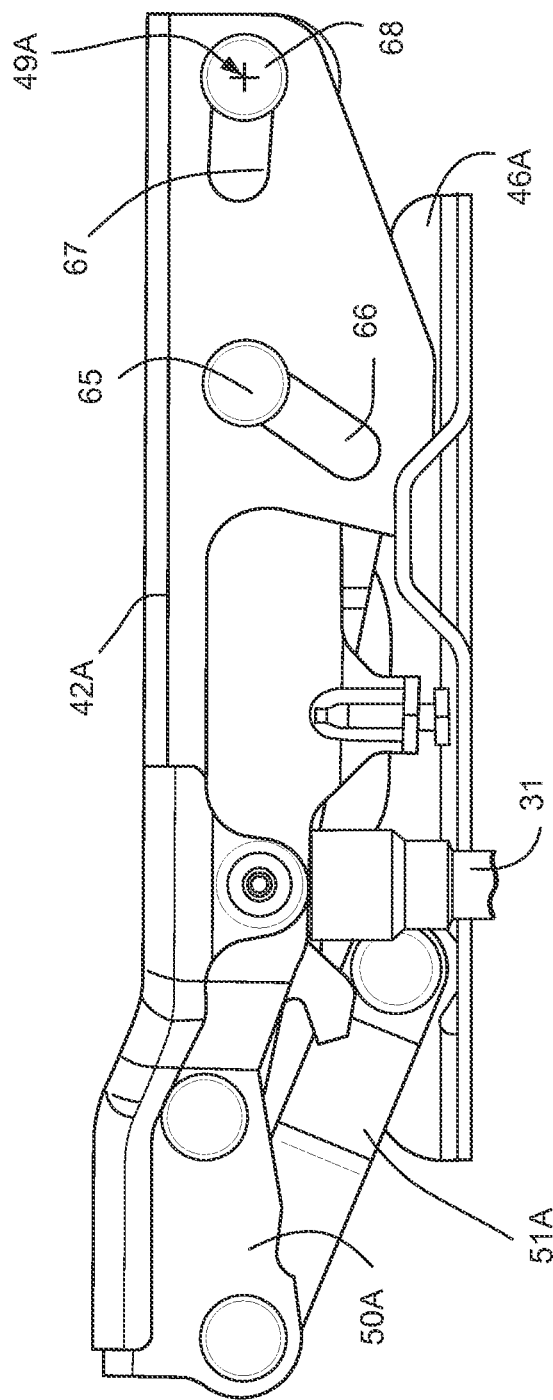
FIGS. 13a and 13b are side elevational views showing a multi-bar hinge with a hood bracket, a body bracket and a deployment bracket in a pre-deployed position and in a deployed position, respectively.
Figure 13B:
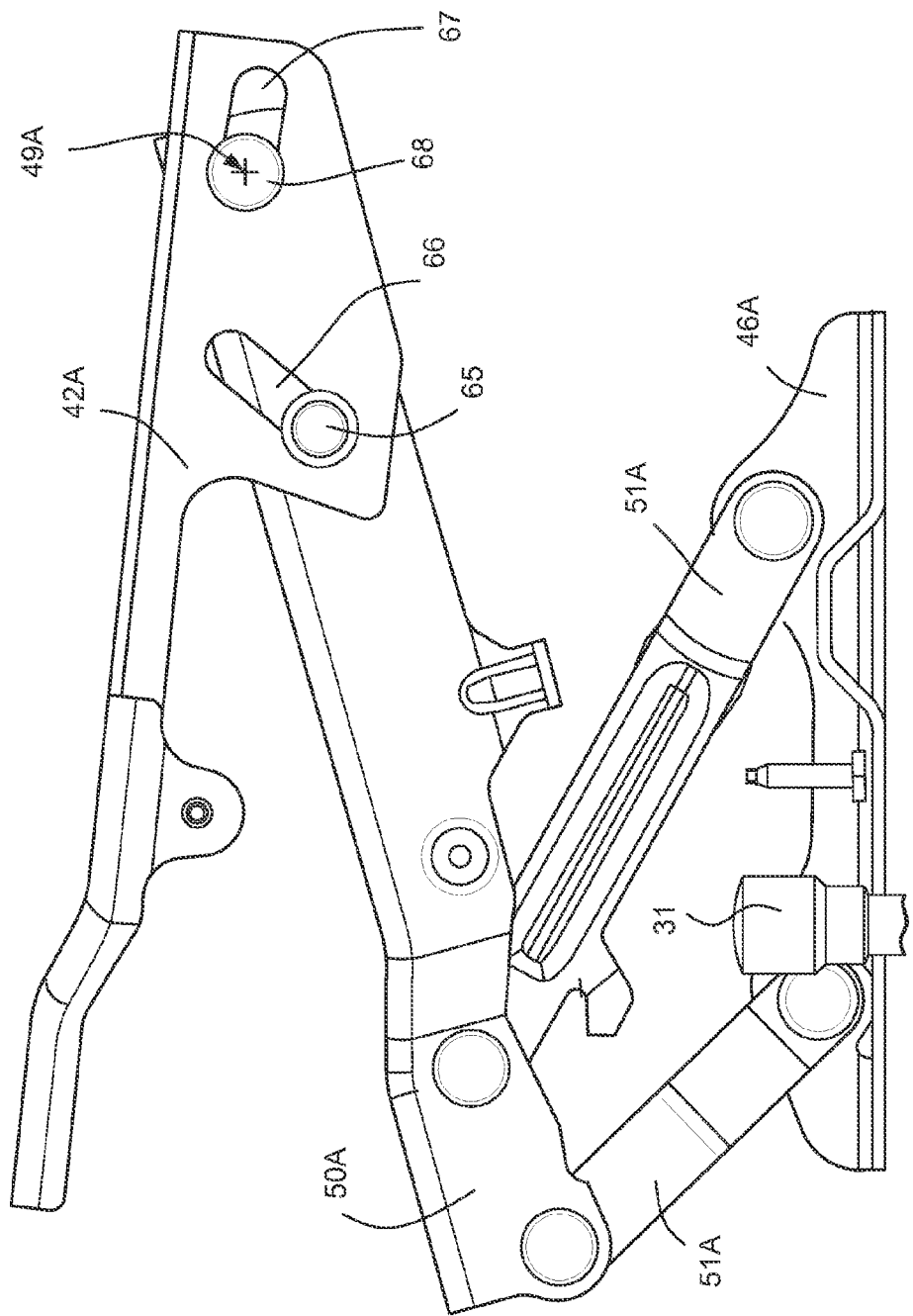

FIGS. 13a and 13b show a multi-bar hinge 40A with a hood bracket 42A, a body bracket 46A and a deployment bracket 50A on which is mounted the reset clip 21. Here again, the multi-bar hinge hood bracket 42A is attached to the vehicle's hood 14, and the body bracket 46A is attached to the vehicle's body 15. Pivotally mounted between deployment bracket 50A and body bracket 46A are pivot brackets 51A, which effect the rotation of the deployment bracket 50A, the hood bracket 42A attached to the deployment bracket 50A, and the hood 14 attached to the hood bracket 42A. The rotational motion of deployment bracket 50A and hood bracket 42A that is effected using pivot brackets 51A results in vehicle hood 14 rotating from a closed position to an open position "around" virtual pivot point 49A. But, here again, when a collision with a pedestrian is detected, an actuator, like the actuator 31 shown in FIG. 6, applies an upward force on the hood bracket 42A, which is sufficient to fracture a shear pin, like the shear pin 22 shown in FIG. 1. The fracturing of shear pin allows the hood bracket 42A, and thus hood 14 which is attached to bracket 42A, to pivot about an additional degree of freedom pivot 49A and reach a deployed position. In the case of the multi-bar hinge 40A shown in FIGS. 13a and 13b, the pivot 49A includes a pivot pin 68, which is mounted on deployment bracket 50A, and which moves within a guide slot 67 in the hood bracket 42A. Also mounted on deployment bracket 50A is a guide pin 65, which also moves within a guide slot 66 in the hood bracket 42A. The arrangement of the pivot pin 68 and guide slot 67 and the guide pin 65 and guide slot 66 forms the slider joint arrangement between the hood bracket 42A and the deployment bracket 50A, which allows the rotation of the entire hood 14 about the striker 13/latch 17 point, as shown in FIGS. 13a and 13b.

Figure 14A:
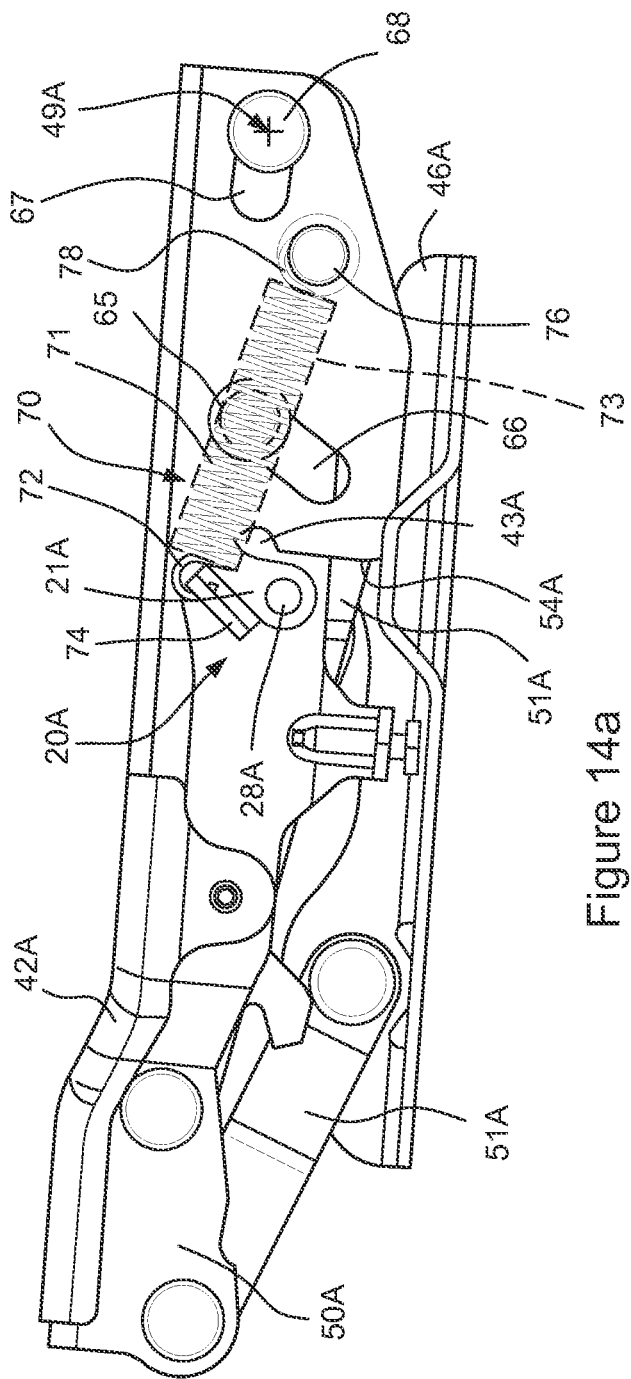
FIGS. 14a to 14c are side elevational views showing a multi-bar active hinge with a modified reset mechanism in a pre-deployed position, in a deployed position and in a reset position, respectively.
Figure 14B:
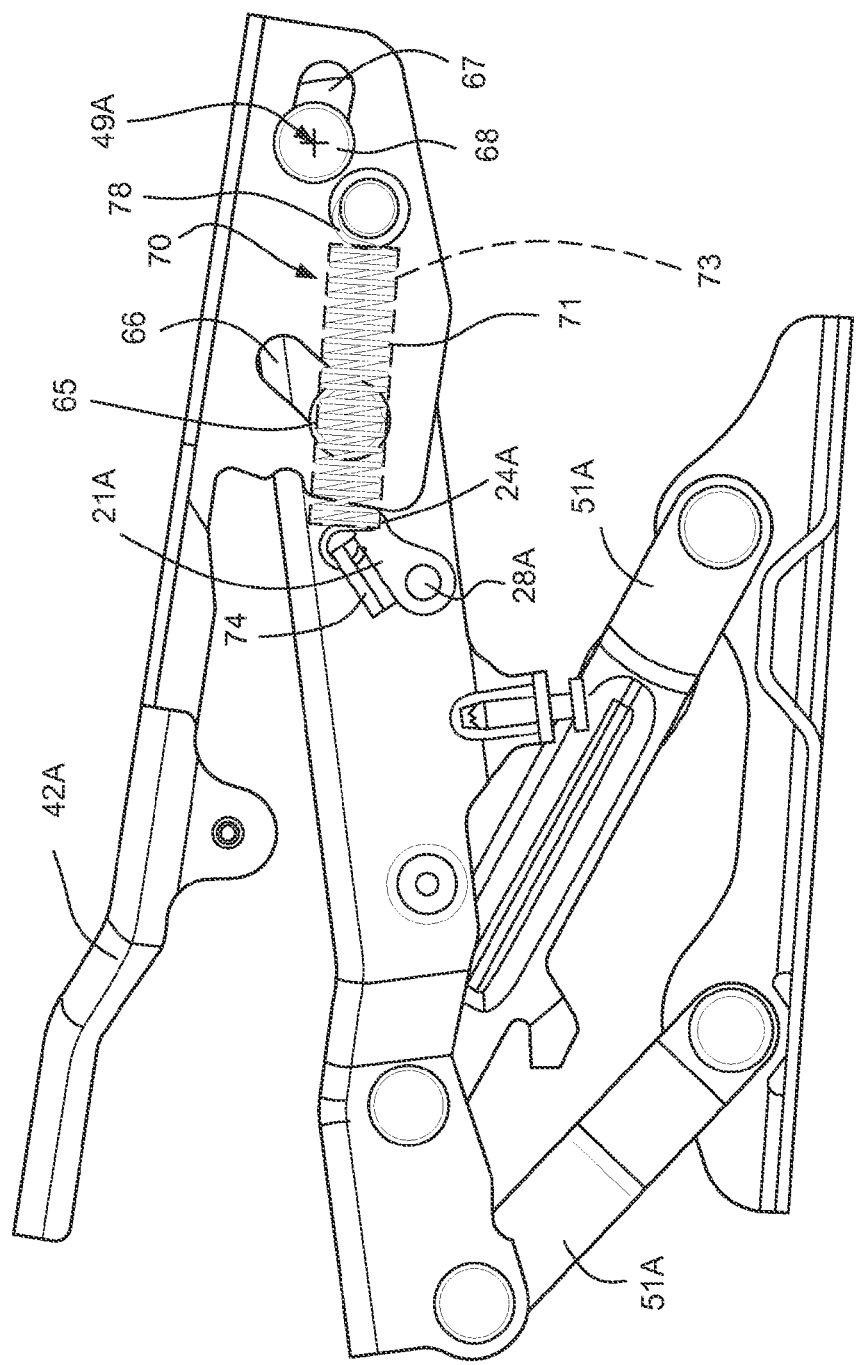
Figure 14C:
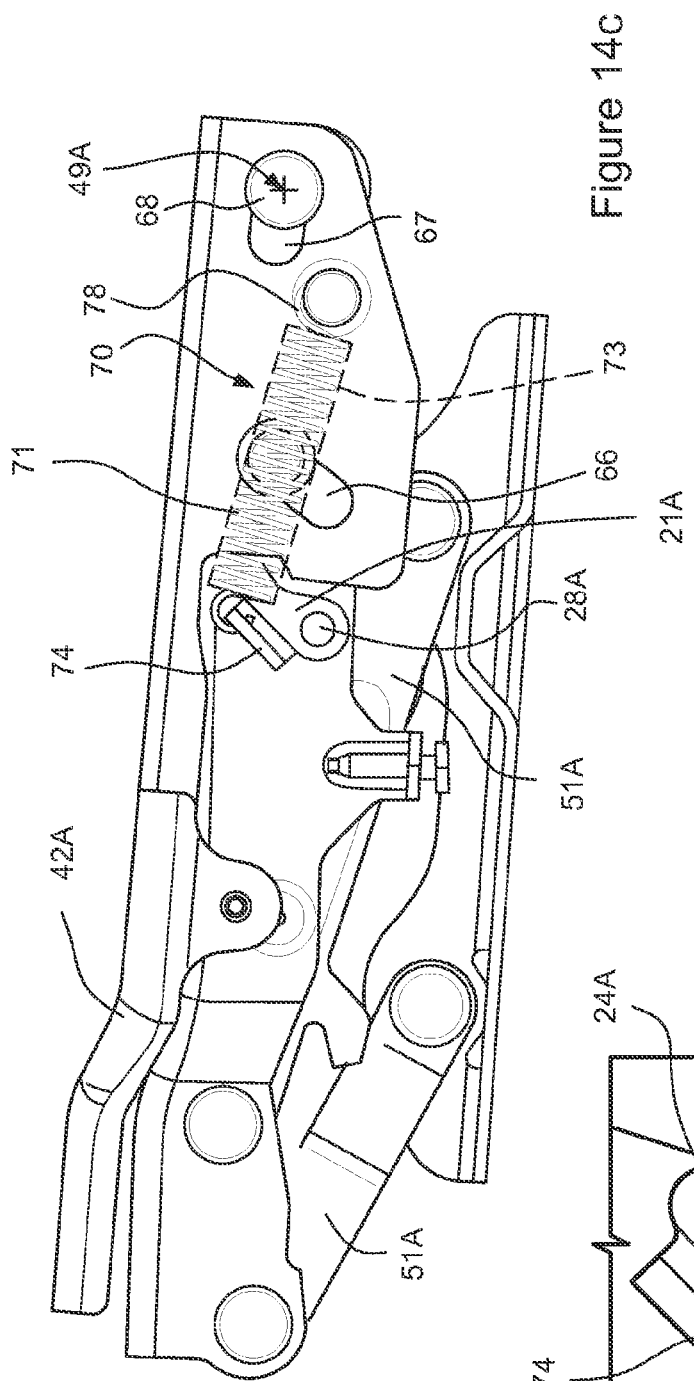

Another problem is customer torsional and clamping requirements of the clip engagement exceed design ability. One solution for this problem is to provide a pawl/extension spring mechanism 70, as shown in FIGS. 14a to 14c, which provides a tunable and high clamp load device. FIG. 14a shows the closed position of a multi-bar active hinge and the spring mechanism, while FIGS. 14b and 14c show the deployed position and the reset position, respectively, of the multi-bar active hinge 40A and the spring mechanism 70.

The multi-bar active hinge 40A shown in FIGS. 14a to 14c is the same as the multi-bar hinge 40A shown in FIGS. 13a and 13b, but such figures also show a modified reset mechanism 20A, which includes a modified reset clip 21A mounted on the deployment bracket 50A and a notch 43A in an edge 45A of hood bracket 42A. The modified reset mechanism 20A also includes the spring mechanism 70 that engages reset clip 21A by means of a first loop end 72 that is hooked into an attachment bracket 74 that is part of reset clip 21A. Reset clip 21A includes an engagement tab 24A, which, when multi-bar active hinge 40A is in its pre-deployed or closed position, is held against hood bracket 42A below the notch 43A in the edge 45A of hood bracket 42A by means of spring 70 that is rotatably mounted on hood bracket 42A by means of another pin 76 also mounted on hood bracket 42A. Spring 70 is connected to pin 76 by a second loop end 78 engaging a flange shaped end of pin 76.

During deployment of the active hinge 40A, so as to allow vehicle hood 14 to lift, hood bracket 42A rotates about pivot 29A. As hood bracket 42A rotates about pivot 29A, engagement tab 24A slides along the edge 45A of hood bracket 42A and past notch 43A in edge 45A until the deployed position shown in FIG. 14b reached by bracket 42A. Engagement tab 24A slides past and above the notch 43A in edge 45A because the spring 71 and the bracket 74 engaged by spring 70 prevent the reset clip 21A, and thereby engagement tab 24A from rotating, so as to prevent tab 24A from entering notch 43A.

Figure 15:
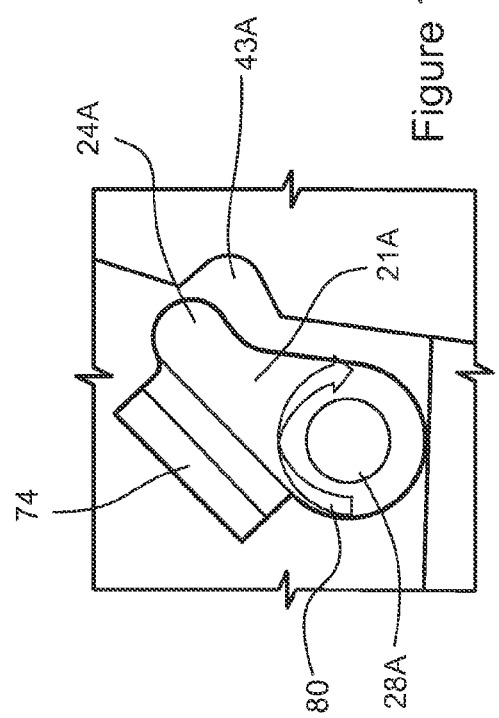
FIG. 15 is a side elevational view depicting rotation of a reset clip about a pivot pin, as shown by an arrow, until an engagement tab enters a notch in a hood bracket, to re-lock the movement between a deployment bracket and the hood bracket when the multi-bar active hinge of FIGS. 14a to 14c is moved to a reset position.

After deployment of active hinge 40A, to re-lock the movement between the deployment bracket 50A and the hood bracket 42A that results from bracket 42A rotating around pivot 29A, a downward force is applied to the vehicle hood 14, and thus hood bracket 42A. Application of the downward force causes engagement tab 24A to again slide along edge 45A of hood bracket 42A in the opposite direction, which allows engagement tab 24A to enter notch 43A in hood bracket 42A. Tab 24A is rotated towards notch 43A by reason of the spring force exerted on reset clip 21A by spring 71. In this regard, engagement tab 24A can be viewed as being somewhat like a pawl with respect to notch 43A. As bracket 42A continues to move downward in response to the downward force, and spring 71 exerts a force on bracket 74, and thus reset clip 21A, whereby reset clip 21A is caused to rotate about pivot pin 28A, as shown by arrow 80 in FIG. 15, until engagement tab 24A enters notch 43A in hood bracket 42A, as shown in inset FIG. 15. Tab 24A engaging notch 43A in conjunction with the spring force exerted on reset clip 21A by spring 71, prevents further rotation of hood bracket 42A in either direction, to thereby maintain active hinge 40A in a reset position, as shown in FIG. 14c.

While the invention has been described in connection with what is presently considered to be the most practical and preferred embodiment with regard to using it with vehicles having a hood and body, it is to be understood that the invention is not to be limited to the disclosed embodiment, but on the contrary, can be used with any application in which an active hinge might be used, and is intended to cover various modifications and equivalent arrangements included within the spirit and scope of the appended claims.

What is claimed is:

1. An active hinge comprising:
   a hood bracket for attachment to a vehicle hood,
   a body bracket for attachment to a vehicle body, and
   a deployment bracket rotatably attached to the body bracket,
   the hood bracket being rotatably attached to the deployment bracket at an one end of the deployment bracket so that the hood bracket rotates from a pre-deployed position to a deployed position when the vehicle hood is opened,
   a reset clip rotatably mounted on the deployment bracket, the reset clip being comprised of an engagement tab and a locking tab located a predetermined angular distance away from the engagement tab around the circumference of the reset clip,
   the reset clip rotating, when the hood bracket is rotated relative to the deployment bracket from the deployed position towards a reset position, until the engagement tab on the reset clip enters a notch in the hood bracket and the locking tab engages a hole in the deployment bracket, to thereby prevent further rotation of the hood bracket and maintain the active hinge in a hinge reset position, and
   one or more curved surfaces mounted on the reset clip to provide surface-to-surface contact between the one or more curved surfaces of the reset clip and the deployment bracket, thereby preventing edge-to-surface contact between the reset clip and the deployment bracket, respectively, whereby the deployment bracket is not scratched when the reset clip is rotated, thereby precluding rust from developing on the deployment bracket.

2. The active hinge of claim 1, wherein the one or more curved surfaces are formed using a plastic nylon powder coating.

3. The active hinge of claim 1, wherein the one or more curved surfaces are comprised of first and second curved surfaces formed on the engagement tab and on the locking tab, respectively.

4. The active hinge of claim 3, wherein the first and second curved surfaces are formed using a plastic nylon powder coating.

5. The active hinge of claim 4, wherein the first and second curved surfaces are formed using a dip of the engagement tab's edge and on the locking tab's edge into the powder coating, after which the coating is baked on the engagement and locking tabs.

6. The active hinge of claim 3, wherein the hood bracket includes an edge along which the first curved surface of the reset clip's engagement tab slides during rotation of the hood bracket from its pre-deployed position to its deployed position.

7. The active hinge of claim 1, wherein the one or more curved surfaces are formed on the engagement tab.

8. The active hinge of claim 1, wherein the one or more curved surfaces are formed on the locking tab.

9. An active hinge comprising:
   a hood bracket for attachment to a vehicle hood,
   a body bracket for attachment to a vehicle body, and
   a deployment bracket rotatably attached to the hood bracket at an one end of the deployment bracket so that the hood bracket rotates from a pre-deployed position to a deployed position when the vehicle hood is opened,
   a pivot bracket rotatably mounted between the deployment bracket and the body bracket, the pivot bracket effecting a rotational motion of the deployment bracket and the hood bracket attached to the deployment bracket that allows the vehicle hood to be rotatable around a virtual pivot point from a closed position to an open position,
   a reset clip rotatably mounted on the deployment bracket, the reset clip being comprised of an engagement tab and a locking tab located a predetermined angular distance around the circumference of the reset clip away from the engagement tab,
   the reset clip rotating, when the hood bracket is rotated relative to the deployment bracket from the deployed position towards a reset position, until the engagement tab on the reset clip enters a notch in the hood bracket and the locking tab engages a hole in the deployment bracket, to thereby prevent further rotation of the hood bracket and maintain the active hinge in a hinge reset position,
   a pivot pin mounted on the deployment bracket and a first guide slot formed in the hood bracket, the pivot pin movable within the first guide slot, and
   a guide pin mounted on the deployment bracket and a first guide slot formed in the hood bracket, the guide pin movable within the second guide slot,
   wherein the pivot pin and first guide slot and the guide pin and second guide slot forms a slider joint arrangement between the hood bracket and the deployment bracket, which allows rotation of the vehicle hood about a striker attached to the vehicle hood and a latch attached to the vehicle that engages the striker.

10. The active hinge of claim 9, wherein the pivot pin mounted on the deployment bracket forward of guide pin mounted on the deployment bracket with respect to the front of the vehicle hood.

11. The active hinge of claim 9, wherein the pivot bracket rotates about the pivot pin when the pivot bracket affects the rotational motion of the deployment bracket and the hood bracket attached to the deployment bracket that allows the vehicle hood to be rotatable around the virtual pivot point from the closed position to the open position.

12. An active hinge comprising:
a hood bracket for attachment to a vehicle hood,
a body bracket for attachment to a vehicle body, and
a deployment bracket rotatably attached to the hood bracket at an one end of the deployment bracket so that the hood bracket rotates from a pre-deployed position to a deployed position when the vehicle hood is opened,
a pivot bracket rotatably mounted between the deployment bracket and the body bracket, the pivot bracket effecting a rotational motion of the deployment bracket and the hood bracket attached to the deployment bracket that allows the vehicle hood to be rotatable around a virtual pivot point from a closed position to an open position,
a reset clip rotatably mounted on the deployment bracket, the reset clip being comprised of an engagement tab, and
an extension spring mechanism that engages the reset clip, the extension spring mechanism providing a tunable and high clamp load device,
the reset clip being caused to rotate by a spring force exerted on the reset clip by the extension spring mechanism, when the hood bracket is rotated relative to the deployment bracket from the deployed position towards a reset position, until the engagement tab on the reset clip enters a notch in the hood bracket,
wherein the engagement tab engaging the notch in the hood bracket in conjunction with the spring force exerted on reset clip by the extension spring mechanism thereby prevents further rotation of the hood bracket and maintains the active hinge in a hinge reset position.

13. The active hinge of claim 12, wherein the reset clip is further comprised of an attachment bracket.

14. The active hinge of claim 13, wherein the spring mechanism that engages reset clip is comprised of a spring having a first loop end hooked into the attachment bracket of the reset clip and a second loop end engaging a pin mounted on the hood bracket.

15. The active hinge of claim 14, wherein the pin mounted on the hood bracket to which is engaged by the second loop end of the spring has a flange shaped end for holding the second loop end in place.

16. A reset mechanism for an active hinge comprising a first movable bracket for attachment to a first movable member, a second bracket for attachment to a second member about which the first movable member rotates, and a third bracket rotatably attached to the second bracket, the first movable bracket also being rotatably attached to the third bracket at one end so that the first movable bracket rotates from a pre-deployed position to a deployed position when the first movable member is opened, the reset mechanism comprising:
a reset clip rotatably mounted on the third bracket, the reset clip being comprised of an engagement tab and a locking tab located a predetermined angular distance away from the engagement tab around the circumference of the reset clip,
the reset clip rotating, when the first movable bracket is rotated relative to the third bracket from the deployed position towards a reset position, until the engagement tab on the reset clip enters a notch in the first movable bracket and the locking tab engages a hole in the third bracket, to thereby prevent further rotation of the first movable bracket and maintain the active hinge in a hinge reset position, and
one or more curved surface(s) mounted on the reset clip to provide surface-to-surface contact between the one or more curved surfaces of the reset clip and the third bracket, edge-to-surface contact between the reset clip and the third bracket, respectively, whereby the third bracket is not scratched when the reset clip is rotated, thereby precluding rust from developing in the third bracket.

17. The reset mechanism of claim 16, wherein the one or more curved surfaces are formed using a plastic nylon powder coating.

18. The reset mechanism of claim 16, wherein the one or more curved surfaces are comprised of first and second curved surfaces formed on the engagement tab and on the locking tab, respectively.

19. The reset mechanism of claim 18, wherein the first and second curved surfaces are formed using a plastic nylon powder coating.

20. The reset mechanism of claim 19, wherein the first and second curved surfaces are formed using a dip of the engagement tab's edge and on the locking tab's edge into the powder coating, after which the coating is baked on the engagement and locking tabs.

21. The reset mechanism of claim 16, wherein the one or more curved surfaces are formed on the engagement tab.

22. The reset mechanism of claim 16, wherein the one or more curved surfaces are formed on the locking tab.

\* \* \* \* \*